United States Patent
Trobaugh et al.

(10) Patent No.: US 10,473,059 B2
(45) Date of Patent: Nov. 12, 2019

(54) NATURAL GAS FUEL SYSTEM FOR AN INTERNAL COMBUSTION ENGINE

(71) Applicant: CUMMINS INC., Columbus, IN (US)

(72) Inventors: Corey W. Trobaugh, Columbus, IN (US); Daniel A. Norrick, New Brighton, MN (US); Randy E. Berg, Minneapolis, MN (US); Brian K. Wagner, Stoughton, WI (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/892,535

(22) Filed: Feb. 9, 2018

(65) Prior Publication Data

US 2018/0163668 A1 Jun. 14, 2018

Related U.S. Application Data (62) Division of application No. 15/511,668, filed on Mar. 16, 2017, filed as application No. (Continued)

(51) Int. Cl.
*F02M 21/02* (2006.01)
*F02C 3/22* (2006.01)
(Continued)

(52) U.S. Cl.
CPC ....... *F02M 21/0227* (2013.01); *B01D 53/225* (2013.01); *B01D 53/94* (2013.01); *F02B 37/00* (2013.01); *F02B 43/12* (2013.01); *F02C 3/22* (2013.01); *F02M 21/0209* (2013.01); *F02M 21/0239* (2013.01); *H01M 8/04022* (2013.01); (Continued)

(58) Field of Classification Search
CPC .......... F02M 21/0227; F02M 21/0209; F02M 21/0239; B01D 53/225; B01D 53/94; F02B 37/00; F02B 2043/103; F02B 43/00; F02B 43/12; F02C 3/22; Y02T 10/144; Y02T 10/32; H01M 2008/1293; H01M 8/04022;
(Continued)

(56) References Cited

U.S. PATENT DOCUMENTS 6,161,386 A 12/2000 Lokhandwala
6,318,306 B1 11/2001 Komatsu
(Continued)

OTHER PUBLICATIONS

International Search Report and Written Opinion, issued by the International Searching Authority, dated Feb. 3, 2016, for related International Application No. PCT/US2015/050552; 5 pages.
(Continued)

*Primary Examiner* — Xiao En Mo
(74) *Attorney, Agent, or Firm* — Faegre Baker Daniels LLP (57) ABSTRACT

A natural gas fueling system supplies methane gas to an engine and includes a filter assembly. The filter assembly includes a gas inlet configured to receive inlet gas and a methane permeable filter configured to separate methane gas and first contaminant gases from the inlet gas. The natural gas fueling system also includes a reformer apparatus configured to convert the first contaminant gases into a reformed gas stream including methane gas. The reformed gas is supplied to the gas inlet and is recirculated through the filter assembly to extract the methane gas from the reformed gas stream.

12 Claims, 8 Drawing Sheets

Related U.S. Application Data

PCT/US2015/050552 on Sep. 17, 2015, now Pat. No. 9,920,711.

(60) Provisional application No. 62/052,776.

(51) Int. Cl.

| | | |
|---|---|---|
| *B01D 53/22* | (2006.01) | |
| *B01D 53/94* | (2006.01) | |
| *F02B 37/00* | (2006.01) | |
| *F02B 43/12* | (2006.01) | |
| *H01M 8/04014* | (2016.01) | |
| *H01M 8/04111* | (2016.01) | |
| *H01M 8/0612* | (2016.01) | |
| *H01M 8/0662* | (2016.01) | |
| *F02B 43/00* | (2006.01) | |
| *F02B 43/10* | (2006.01) | |
| *H01M 8/124* | (2016.01) | |

(52) U.S. Cl.
CPC ...... *H01M 8/04111* (2013.01); *H01M 8/0618* (2013.01); *H01M 8/0687* (2013.01); *F02B 43/00* (2013.01); *F02B 2043/103* (2013.01); *H01M 2008/1293* (2013.01); *Y02T 10/144* (2013.01); *Y02T 10/32* (2013.01)

(58) Field of Classification Search
CPC ............. H01M 8/0618; H01M 8/0687; H01M 8/04111
See application file for complete search history.

(56) References Cited

U.S. PATENT DOCUMENTS

| | | |
|---|---|---|
| 6,508,209 B1 | 1/2003 | Collier, Jr. |
| 7,210,467 B2 | 5/2007 | Kweon |
| 7,343,905 B2 | 3/2008 | Willi |
| 7,429,287 B2 | 9/2008 | Frantz |
| 7,587,998 B2 | 9/2009 | Hotta |
| 7,866,161 B2 | 1/2011 | Mahlanen |
| 8,440,358 B2 | 5/2013 | Grieve |
| 2005/0233188 A1 | 10/2005 | Kurashima |
| 2005/0279333 A1 | 12/2005 | Kweon |
| 2009/0263691 A1 | 10/2009 | Masui |
| 2009/0314227 A1 | 12/2009 | Mahlanen |
| 2014/0260203 A1 | 9/2014 | LaPointe |

OTHER PUBLICATIONS

International Preliminary Report on Patentability, issued by the International Searching Authority, dated Feb. 3, 2016, for related International Application No. PCT/US2015/050552; 6 pages.
International Search Report and Written Opinion dated Feb. 3, 2016 in PCT/US2015/050552, 9 pages.

NATURAL GAS FUEL SYSTEM FOR AN INTERNAL COMBUSTION ENGINE

CROSS-REFERENCE TO RELATED APPLICATIONS

The present application is a divisional of U.S. patent application Ser. No. 15/511,668, filed Mar. 16, 2017, and entitled "NATURAL GAS FUEL SYSTEMS FOR AN INTERNAL COMBUSTION ENGINE," which is a national stage entry of International (PCT) Patent Application Serial No. PCT/US2015/050552, filed on Sep. 17, 2015, and entitled "NATURAL GAS FUEL SYSTEM FOR AN INTERNAL COMBUSTION ENGINE," which claims priority to U.S. Provisional Patent Application Ser. No. 62/052,776, filed Sep. 19, 2014, and entitled "NATURAL GAS FUEL SYSTEMS FOR AN INTERNAL COMBUSTION ENGINE", the complete disclosures of which are expressly incorporated by reference herein.

TECHNICAL FIELD OF THE PRESENT DISCLOSURE

The present invention generally relates to a natural gas fuel system for an internal combustion engine, and more particularly, to a natural gas fuel system configured to consistently provide the internal combustion engine with fuel that has a predetermined combustion properties.

BACKGROUND OF THE PRESENT DISCLOSURE

Natural gas may be supplied to engines as fuel and comprises several different gases including methane and others, such as, ethane, propane, butane, carbon dioxide, oxygen, hydrogen, and nitrogen. Natural gas also may include water and hydrogen sulfide. Natural gas may also include large or unsaturated hydrocarbons, which are hydrocarbons with double or triple covalent bonds between adjacent carbon atoms.

Each of the gases comprising natural gas may have different combustion properties which correlate to the knock tendency or knock resistance of that gas during combustion in an engine. A methane number (MN) is an index number for classifying gases according to their knock resistance. For example, methane gas has a high knock resistance and, therefore, has a methane number of 100, while hydrogen gas has a low knock resistance because it combusts fasters than methane gas and, therefore, has a methane number of 0.

The methane number for a given natural gas affects the fueling of an internal combustion engine. For example, the valve timing and injection timing may be adjusted according to the methane number of the gas supplied to the engine in order to prevent knocking in the combustion chambers.

SUMMARY OF THE PRESENT DISCLOSURE

In one embodiment of the present disclosure, a natural gas fueling system supplies methane gas to an internal combustion engine and comprises a filter assembly. The filter assembly includes a gas inlet configured to receive inlet gas and a methane permeable filter configured to separate methane gas and first contaminant gases from the inlet gas. The natural gas fueling system also comprises a reformer apparatus configured to convert the first contaminant gases into a reformed gas stream including methane gas. The reformed gas is supplied to the gas inlet and is recirculated through the filter assembly to extract the methane gas from the reformed gas stream.

In another embodiment of the present disclosure, an engine comprises a plurality of combustion cavities and a natural gas fueling system. The natural gas fueling system is operably coupled to the combustion cavities and comprises a filter assembly including a gas inlet and a methane permeable filter to separate methane gas and first contaminant gases. Additionally, the natural gas fueling system includes a reformer apparatus configured to reform the first contaminant gases into a reformed gas stream including methane gas. The reformed gas is supplied to the gas inlet and is recirculated through the filter assembly. Also, the methane gas separated by the filter assembly is supplied to the plurality of combustion cavities and combusted therein to produce exhaust gases. At least a portion of the exhaust gases are supplied to the reformer apparatus and are configured to heat the reformer apparatus.

In a further embodiment of the present disclosure, a method of fueling an engine comprises supplying natural gas to a filter assembly, separating the natural gas into at least methane gas and a first contaminant gas in the filter assembly, and circulating exhaust gases from an internal combustion engine through a reformer apparatus. Additionally, the method comprises reforming the first contaminant gas into at least methane gas and a second contaminant gas in the reformer apparatus, separating the methane gas from the second contaminant gas, and supplying the methane gas separated from the natural gas and from the reformed first contaminant gas to the internal combustion engine.

In another embodiment, a natural gas fueling system for an energy source, comprises a filter assembly including a gas inlet configured to receive inlet gas and a methane permeable filter configured to separate methane gas and first contaminant gases from the inlet gas. The natural gas fueling system also comprises a conduit fluidly coupled to the filter assembly and the energy source to deliver the methane gas to the energy source. Also, the natural gas fueling system comprises a supplemental fluid assembly fluidly coupled to the filter assembly and the energy source, the energy source being configured to receive the first contaminant gases from the supplemental fluid assembly.

In a further embodiment, a method of fueling an energy source comprises supplying natural gas to a filter assembly, separating the natural gas into at least methane gas and a first contaminant gas in the filter assembly, delivering the methane gas to the energy source, and providing the first contaminant gas to the energy source.

DETAILED DESCRIPTION OF THE DRAWINGS

In one embodiment of the present disclosure, a natural gas fueling system 100 provides methane gas to an internal combustion engine 150. Natural gas fueling system 100 may be an on-board assembly directly supported on engine 150. Illustratively, natural gas fueling system 100 is an on-board assembly provided separately, and spaced apart, from engine 150. In particular, natural gas fueling system 100 may be positioned in proximity to engine 150 but is not supported directly on engine 150 or contained within the engine housing. For example, in one embodiment, engine 150 may be provided in a stationary generator supported on a concrete pad and natural gas fueling system 100 also may be supported on the concrete pad in proximity to engine 150. As such, the size of natural gas fueling system 100 may be reduced to correspond to the unoccupied area of the platform or location supporting engine 150. Therefore, engine 150 and natural gas fueling system 100 may be positioned adjacent each other or in a defined proximity to each other.

Engine 150 includes at least one combustion chamber or cavity (not shown). During fuel injection processes in engine 150, fuel is injected into the combustion chambers and combusts. Exhaust gases from the injection processes are released from the combustion chambers before a subsequent fuel injection process is initiated. As disclosed herein, engine 150 may operate entirely on methane gas. Alternatively, engine 150 may comprise a dual-fuel internal combustion engine that operates, at different times, on one of at least two fuels, or a combination of these fuels. Exemplary fuels include methane gas, diesel, dimethyl ether, and gasoline.

Figure 1:
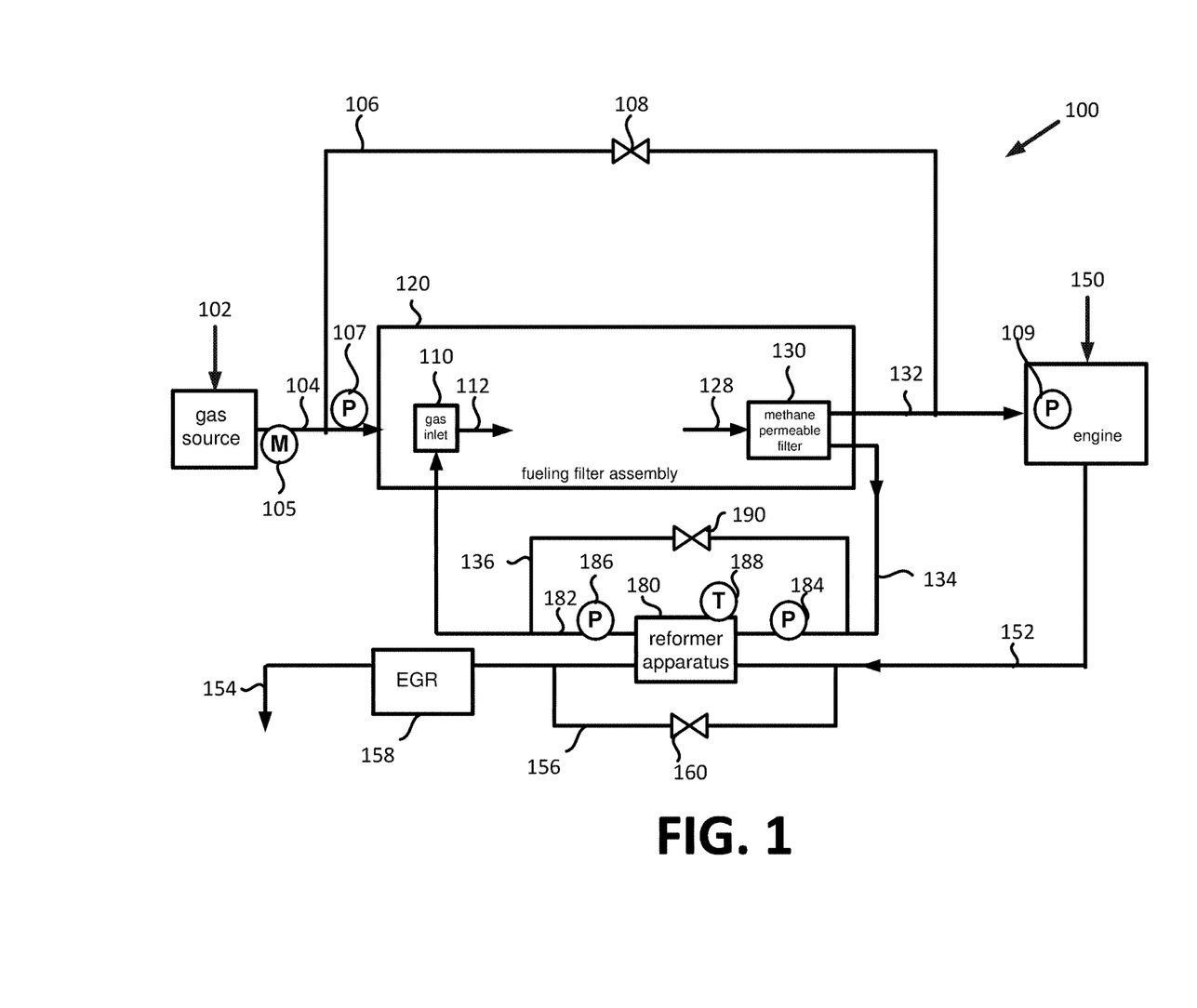
FIG. 1 is a block diagram illustrating an embodiment of a natural gas fueling system set forth in the disclosure.

Referring to FIG. 1, natural gas fueling system 100 is operably coupled to engine 150 and includes a gas source 102, a gas inlet 110, a fueling filter assembly 120, and a reformer apparatus 180. As shown in FIG. 1, natural gas fueling system 100 receives natural gas from a gas source 102. Gas source 102 may be an underground natural gas reservoir, a natural gas tank, or other storage-type container or location for natural gas. When in gas source 102, the natural gas may be compressed.

The natural gas flows from gas source 102 to filter assembly 120 through a conduit or gas line 104. More particularly, natural gas flows from gas source 102 into inlet 110 where the natural gas may be combined with additional supplies of gas, as disclosed further herein. The natural gas mixture from inlet 110 is then directed toward filter assembly 120 through a conduit or line 112. Conduit 112 is fluidly coupled to an inlet conduit or line 128 of filter assembly 120 such that the natural gas mixture from inlet 110 flows into filter assembly 120 through conduits 112, 128.

Filter assembly 120 includes a methane permeable filter 130 to separate or extract the methane gas from the raw natural gas. Before flowing through filter assembly 120, the natural gas may not have the combustion characteristics necessary for proper operation of engine 150 because the natural gas contains gases other than methane, large or unsaturated hydrocarbons, and/or contaminants, which affect the methane number of the natural gas. In other words, the methane number of the natural gas may be outside of a predetermined range of methane numbers that correlates to the operating conditions of engine 150. However, after the natural gas flows through filter assembly 120, the methane gas extracted from the natural gas has the combustion characteristics necessary for proper operation of engine 150, as evidenced by a methane number within the predetermined range.

Methane permeable filter 130 may be a generally non-porous membrane for separating contaminants and/or other gases from the methane gas in the natural gas. For example, methane permeable filter 130 may have a critical volume ($V_C$) of approximately 90-110 cm$^3$/mol. Additionally, methane permeable filter 130 may be comprised of a polymeric material. For example, materials comprised of acetate, polyimide, ether, amide, silicone rubber, and other polymeric materials may be used for methane permeable filter 130. The properties of methane permeable filter 130 may be modified or tuned to adjust the properties of the methane gas separated from the natural gas. For example, the porosity, critical volume, and/or material of methane permeable filter 130 may be modified to output methane gas with a specific, predetermined methane number.

After the natural gas flows through methane permeable filter 130, the natural gas is separated into two gas streams. The first gas stream comprises methane gas defined by a predetermined methane number and the second gas stream comprises first contaminant gases, such as non-methane gases or additional/residual gases present in the first gas stream which are not filtered by methane permeable filter 130. In other words, methane permeable filter 130 may "extract" or otherwise separate methane gas from the other gases, hydrocarbons, and other contaminants in the natural gas. After the natural gas flows through methane permeable filter 130, the first gas stream may have a methane number of 50-100, and more particularly 70. More particularly, the methane permeable filter 130 is configured to filter the natural gas to produce a first gas stream comprised of methane gas with a specific methane number. The methane gas comprising the first gas stream is directed toward engine 150 through a methane conduit or line 132 and is injected into the combustion chambers of engine 150 for combustion therein. Because the methane number of the first gas stream is within a predetermined range of methane numbers which are correlated to the fueling characteristics of engine 150, the likelihood of knock occurring in the combustion chambers due to the characteristics of the fuel is reduced. By receiving a constant flow of fuel with a consistent methane number, the number of adjustments made to the fueling characteristics (e.g., timing) of engine 150 decreases and the likelihood of knock occurring as a result of the properties of the fuel also decreases. After combustion, heated exhaust gases from the combustion chambers of engine 150 flow through an exhaust conduit or line 152.

The second gas stream is comprised of the first contaminant gases within the natural gas, which may include gases other than methane present in the natural gas (e.g., butane, ethane, propane), hydrocarbons, and/or other contaminants (e.g., particulate matter). As shown in FIG. 1, the first contaminant gases of the second gas stream flow through conduit 134 and into reformer apparatus 180 to convert or reform at least a portion of the first contaminant gases of the second gas stream into a reformed gas including methane gas.

Illustrative reformer apparatus 180 is a catalytic reformer which may be activated by heat at a range of elevated temperatures or, alternatively, may be activated at a range of decreased temperatures. More particularly, reformer apparatus 180 may be thermally activated when the temperature of the catalyst therein increases to an activation temperature. To increase the temperature of reformer apparatus 180, at least a portion of the heated exhaust gases flowing through exhaust conduit 152 from engine 150 are directed toward reformer apparatus 180. As such, the heated exhaust gases from engine 150 increase the temperature of reformer apparatus 180, thereby activating reformer apparatus 180. After flowing past and/or through reformer apparatus 180, the exhaust gases may be released to the atmosphere through a conduit 154 and directed away from natural gas fueling system 100 and engine 150.

Alternatively, in one embodiment, natural gas fueling system 100 may be operably coupled to an exhaust gas recirculation assembly ("EGR") 158. As shown in FIG. 1, EGR 158 is fluidly coupled to exhaust conduit 152 and is configured to receive exhaust gases from engine 150 after the exhaust gases heat reformer apparatus 180. EGR 158 is configured to reduced emissions of nitrogen oxide by recirculating at least a portion of the exhaust gases from engine 150 back to engine 150.

Referring still to FIG. 1, when activated by the heat of the exhaust gases, reformer apparatus 180 catalytically "cracks" or otherwise reforms the first contaminant gases of the second gas stream into at least methane gas and a second contaminant gas. For example, the hydrocarbons may be reformed into at least methane gas. The volume of combustion gases exhausted through exhaust conduit 152 may be regulated by an exhaust valve 160 to control the temperature of reformer apparatus 180 and maximize its ability to crack the first contaminant gas into at least methane gas and the second contaminant gas. As such, after the first contaminant gases flow through reformer apparatus 180, at least a portion of the first contaminant gases is purified or converted to methane. The second contaminant gas comprises unreformed gases present in the natural gas (e.g., butane, ethane, propane), unreformed hydrocarbons, and/or other contaminants. This entire reformed gas stream, including the reformed methane and the second contaminant gas, then flows from reformer apparatus 180 into a reformed gas conduit or line 182 toward inlet 110.

Once at inlet 110, the reformed gas stream mixes with incoming, raw natural gas from gas source 102 and recirculates through filter assembly 120. Filter assembly 120 again separates the raw natural gas into methane gas and the first contaminant gases, and also separates or extracts the reformed methane gas from the second contaminant gas of the reformed gas stream. Once again, the methane separated from the natural gas stream and the reformed gas stream is directed toward engine 150 for combustion, while the mixture of the first and second contaminant gases flows into conduit 134 and toward reformer apparatus 180.

In one embodiment, natural gas fueling system 100 of FIG. 1 also includes a filter bypass assembly, which includes a bypass conduit or line 106 and a bypass valve 108. The filter bypass assembly is operably coupled to a methane gas sensor 105 and a natural gas pressure sensor 107 on conduit 104 and a methane gas pressure sensor 109 on engine 150. Bypass valve 108 and sensors 105, 107, 109 may be operably coupled to a computer or other device (not shown) for receiving information from sensors 105, 107, 109. The computer then outputs information to other components of natural gas fueling system 100 and engine 150 based on the information from sensors 105, 107, 109. As disclosed herein, the filter bypass assembly may be activated when the methane number of the raw natural gas is within the predetermined range of index values correlated to engine 150, when the pressure in methane conduit 132 is below a predetermined value, and/or when filter assembly 120 is working improperly and/or is being repaired or serviced.

For example, when engine 150 is continuously operated, it is necessary to provide an uninterrupted flow of natural gas to engine 150 to maintain such operation. However, when filter assembly 120 is not working properly and/or is being serviced, the filter bypass assembly may be activated by opening filter bypass valve 108 to provide unfiltered natural gas fuel to engine 150 through bypass conduit 106 to continue operation of engine 150, rather than stopping engine 150 while filter assembly 120 is being serviced. As such, the filter bypass assembly allows engine 150 to maintain a continuous operation even when filter assembly 120 is not operating.

Additionally, the filter bypass assembly may be activated in response to a determination or measurement from methane gas sensor 105 or by a change in the duty cycle of engine 150 (e.g., changes in the load on engine 150). More particularly, methane gas sensor 105 determines the methane number of the raw natural gas flowing from gas source 102 to inlet 110 through conduit 104. When the methane number of the incoming, raw natural gas is outside of the predetermined range of methane numbers correlated to the operation of engine 150, the filter bypass assembly is not activated (i.e., bypass valve 108 remains closed) and the raw natural gas flows into filter assembly 120 such that methane gas is separated therefrom for combustion and contaminant gases are reformed for future combustion.

However, when the methane number of the incoming raw natural gas is within the predetermined range of methane numbers correlated to engine 150, the filter bypass assembly may be activated. With such incoming raw natural gas, it may be unnecessary to use filter assembly 120 to affect the methane number of the natural gas because the natural gas may already have a methane number necessary for proper operation of engine 150. As such, the filter bypass assembly may be activated and the raw natural gas bypasses filter assembly 120 and flows into bypass conduit 106. More particularly, bypass valve 108 is opened to allow the raw natural gas to flow from conduit 104, into bypass conduit 106, through bypass valve 108, and into methane conduit 132 for combustion in engine 150. As such, the filter bypass assembly allows unfiltered, raw natural gas to flow into engine 150 for combustion.

The filter bypass assembly also may be activated in response to a determination or measurement from natural gas pressure sensor 107 on conduit 104 and/or methane gas pressure sensor 109 on engine 150. For example, when the pressure of the incoming, raw natural gas is above a predetermined pressure value, damage may occur to filter assembly 120 and/or filter assembly 120 may not operate efficiently due to the increased pressure. Additionally, when the pressure of the incoming, raw natural gas is below a predetermined pressure value, the pressure of the methane flowing from filter assembly 120 to engine 150 may not be adequate for proper fuel injection. As such, the filter bypass assembly may be activated in response to the pressure of the incoming, raw natural gas for proper and efficient operation of natural gas fueling system 100 and engine 150.

Referring to FIG. 1, natural gas pressure sensor 107 determines the pressure of the raw natural gas flowing from gas source 102 to inlet 110 through conduit 104. When the pressure of the incoming, raw natural gas is outside of a predetermined pressure range, the filter bypass assembly is activated and the raw natural gas bypasses filter assembly 120 and flows into bypass conduit 106. Bypass valve 108 opens to allow the raw natural gas to flow from conduit 104, into bypass conduit 106, through bypass valve 108, and into methane conduit 132 for combustion in engine 150. As such, the filter bypass assembly allows unfiltered, raw natural gas to flow into engine 150 for combustion.

However, when the pressure of the incoming raw natural gas is within the predetermined pressure range, the filter bypass assembly is not activated (i.e., bypass valve 108 remains closed) and the raw natural gas flows into filter assembly 120 such that methane gas is separated therefrom for combustion and contaminant gases are reformed for future combustion.

Similarly, when the pressure in methane conduit 132 is less than a predetermined pressure necessary for proper operation of engine 150, the filter bypass assembly may be activated to ensure that a proper quantity of fuel is being supplied to engine 150 at a proper operating pressure. More particularly, when the pressure in methane conduit 132 is less than the predetermined pressure required by engine 150, filter bypass valve 108 may be activated to allow the raw natural gas to flow through bypass conduit 106 and into engine 150.

As shown in FIG. 1, natural gas fueling system 100 also includes a reformer bypass assembly fluidly coupled to conduits 134, 182. The reformer bypass assembly also is operably coupled to an inlet pressure sensor 184, an outlet pressure sensor 186, and a temperature sensor 188. Sensors 184, 186, 188 are operably coupled to the computer (not shown) such that the computer receives information therefrom and outputs information to other components of natural gas fueling system 100 and engine 150 based on the information from sensors 184, 186, 188.

The reformer bypass assembly includes a reformer bypass valve 190 and a bypass conduit 136. The reformer bypass assembly allows the contaminant gases separated from the methane gas to bypass reformer apparatus 180 based on determinations from sensors 184, 186, 188. For example, if pressure in conduit 134 is outside of a predetermined pressure range, the reformer bypass assembly may be activated to divert the contaminant gases away from reformer apparatus 180 to prevent inefficient operation or damage to reformer apparatus 180. As such, if pressure sensor 184 and/or the computer (not shown) measures or otherwise determines that pressure in conduit 134 is greater than a predetermined pressure value, then the reformer bypass assembly is activated by opening reformer bypass valve 190 to allow the contaminant gases from methane permeable filter 130 to flow through bypass conduit 136, instead of through reformer apparatus 180 and conduit 182.

Similarly, if the pressure in conduit 134 is less than a predetermined range of pressure values, this may be an indication that the volume of the contaminant gases is low and, as such, it may not be necessary to operate reformer apparatus 180. More particularly, if pressure sensor 184 and/or the computer (not shown) measures or otherwise determines that pressure in conduit 134 is less than a predetermined pressure value, then the reformer bypass assembly is activated by opening reformer bypass valve 190 to allow the contaminant gases from methane permeable filter 130 to flow through bypass conduit 136, instead of through reformer apparatus 180 and conduit 182.

Additionally, if a temperature of reformer apparatus 180 is outside of a predetermined temperature range, the reformer bypass assembly may be activated to divert the contaminant gases away from reformer apparatus 180. For example, if the temperature of reformer apparatus 180 is greater than a predetermined temperature, reformer apparatus 180 may not operate efficiently and/or the contaminant gases may not be efficiently or properly reformed. As such, if the temperature of reformer apparatus 180 is greater than a predetermined temperature, the reformer bypass assembly is activated by opening reformer bypass valve 190 to allow the contaminant gases to flow through bypass conduit 136, instead of through reformer apparatus 180 and conduit 182.

Also, as shown in FIG. 1, if the temperature of reformer apparatus 180 is less than a predetermined temperature, reformer apparatus 180 does not reform the contaminant gases because the catalyst (not shown) of reformer apparatus 180 may not be activated. More particularly, the catalyst of reformer apparatus 180 is thermally activated such that when the temperature of the catalyst increases to a predetermined temperature, the catalyst reforms the contaminant gases. For example, when natural gas fueling system 100 initially operates, the temperature of reformer apparatus 180 may be below the predetermined temperature because exhaust gases have not yet increased the temperature reformer apparatus 180. As such, the catalyst of reformer apparatus 180 is not activated at the onset of the operation of natural gas fueling system 100 and, therefore, contaminant gases from methane permeable filter 130 are diverted away from reformer apparatus 180.

As shown in FIG. 1, natural gas fueling system 100 also includes an exhaust bypass assembly fluidly coupled to exhaust conduit 152 and conduit 154. The exhaust bypass assembly includes a bypass conduit 156 and exhaust valve 160. As disclosed herein, if the temperature of reformer apparatus 180 is greater than a predetermined, reformer apparatus 180 may not operate efficiently and/or the contaminant gases may not be efficiently or properly reformed. As such, if the temperature of reformer apparatus 180 is greater than a predetermined temperature, the exhaust bypass assembly is activated by opening exhaust bypass valve 160 to allow the contaminant gases to flow through bypass conduit 156, instead of reformer apparatus 180 to prevent further heating of thereof. In this way, the exhaust bypass assembly regulates and maintains a generally constant temperature of reformer apparatus 180.

Figure 1A:
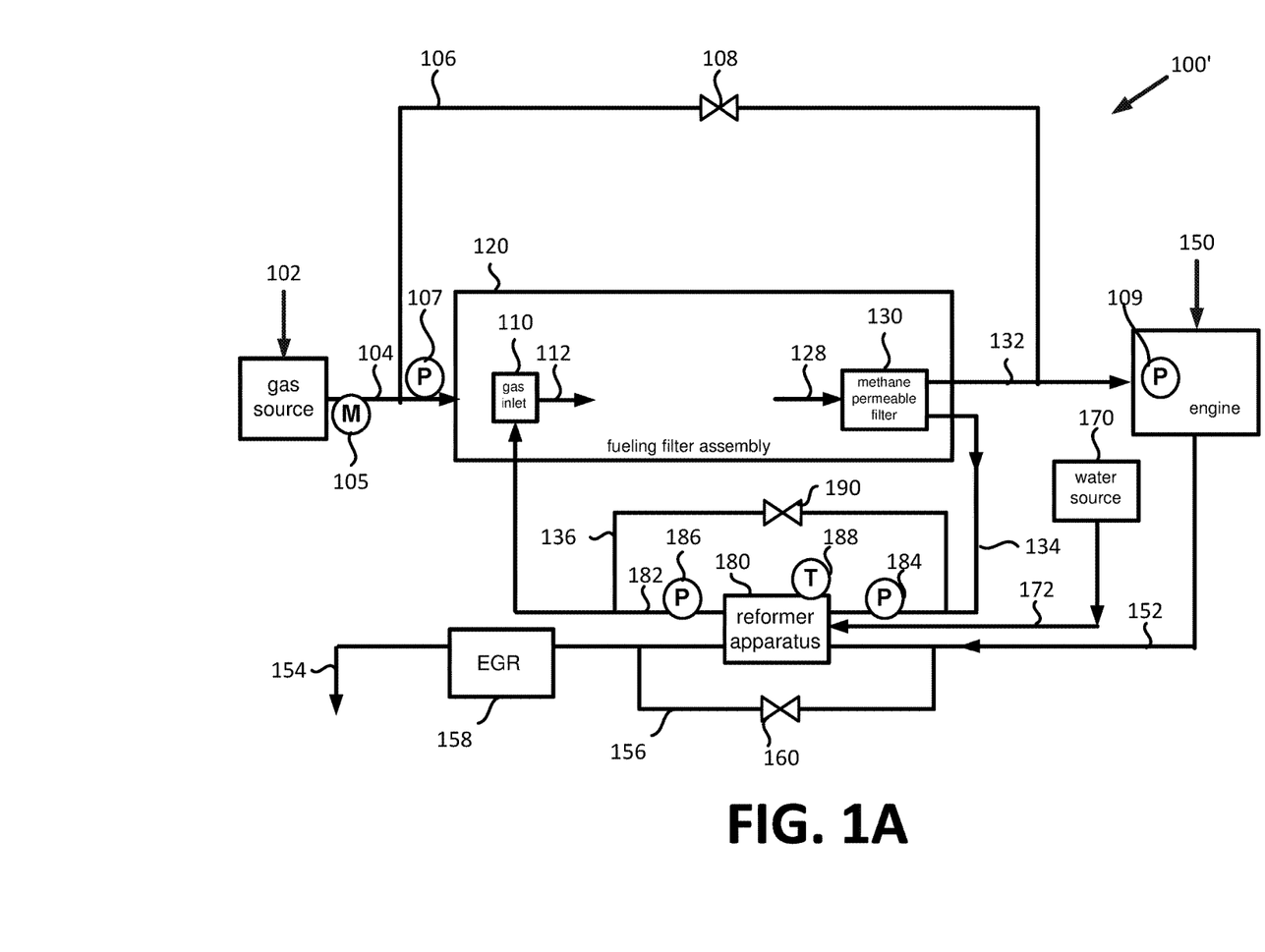
FIG. 1A is an alternative embodiment block diagram illustrating an alternative embodiment of the natural gas fueling system of FIG. 1 and including a water source.

Referring to FIG. 1A, an alternative embodiment of natural gas fueling system 100 of FIG. 1 is shown as natural gas fueling system 100'. Natural gas fueling system 100' is similar to natural gas fueling system 100 (FIG. 1) and is operably coupled to engine 150. Similar to natural gas fueling system 100, natural gas fueling system 100' includes gas source 102, inlet 110, filter assembly 120, and reformer apparatus 180, and is configured to separate methane gas from the natural gas stream with methane permeable filter 130 and reform the contaminant gases into methane gas through a catalytic process. Natural gas fueling system 100' further a water source or storage container 170 and a conduit 172 fluidly coupled to reformer apparatus 180. The water in water source 172 is directed to reformer apparatus 180 through conduit 172. In this way, water may be provided to reformer apparatus 180 in either liquid form or vapor form (i.e., steam) to interact with particular catalyst alloy combinations that may be required for specific applications of engine 150. For example, the water from water source 170 may be necessary to activate the catalyst within reformer apparatus 180. Natural gas fueling system 100' may further include valves, seals, and sensors, such as pressure and/or temperature sensors, for water source 170 and conduit 172.

Figure 2:
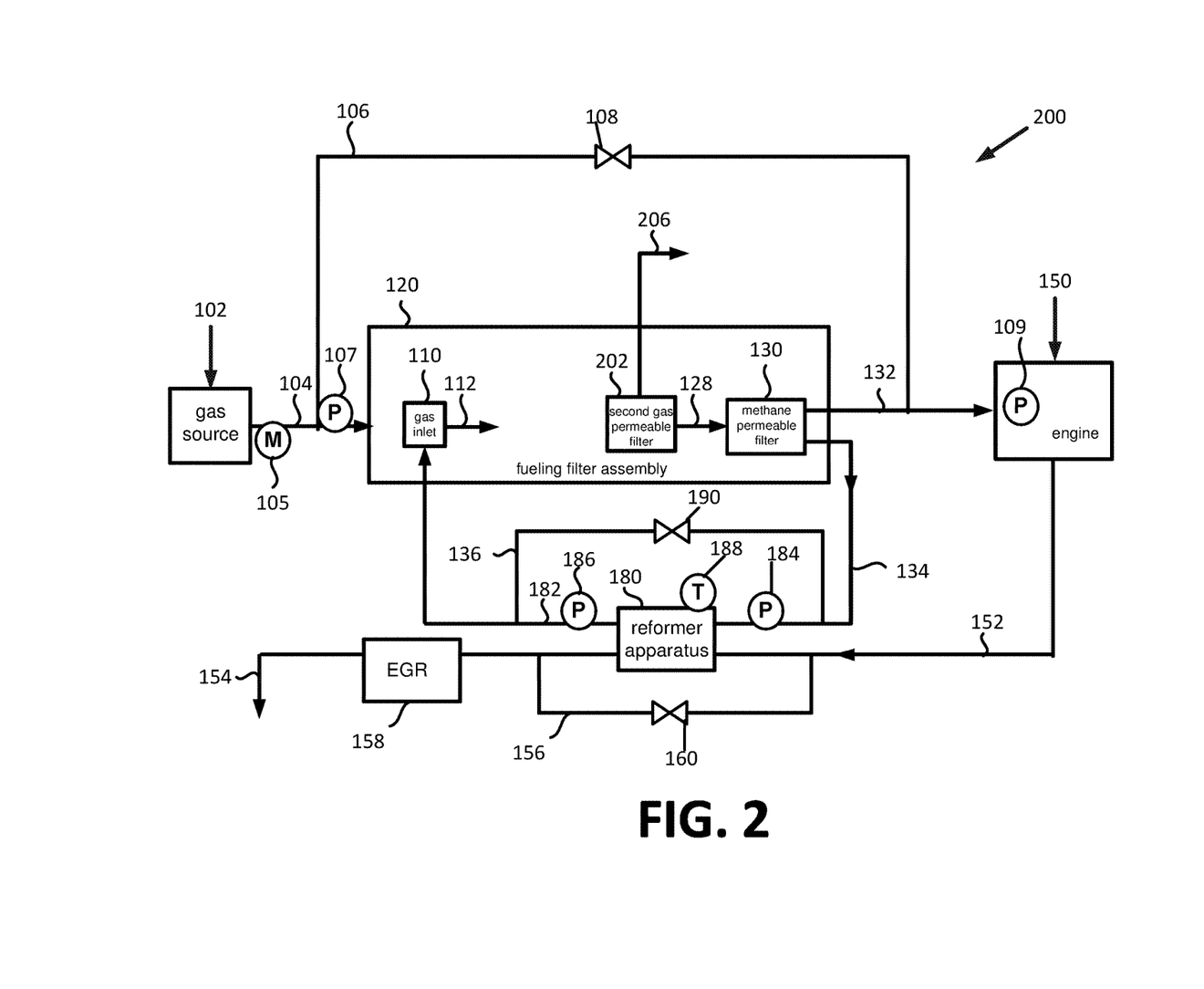
FIG. 2 is a block diagram illustrating an alternative embodiment natural gas fueling system set forth in the disclosure.

Referring to FIG. 2, an alternative embodiment natural gas fueling system 200 is shown. Natural gas fueling system 200 is similar to natural gas fueling system 100 (FIG. 1) and is operably coupled to engine 150. Similar to natural gas fueling system 100, natural gas fueling system 200 includes gas source 102, inlet 110, filter assembly 120, and reformer apparatus 180, and is configured to separate methane gas from the natural gas stream with methane permeable filter 130 and reform the contaminant gases into methane gas through a catalytic process. Natural gas fueling system 200 further includes a second filter assembly operably coupled to filter assembly 120. The second filter assembly includes a second gas permeable filter 202 and a conduit 206. In particular, as shown in FIG. 2, second gas permeable filter 202 is fluidly coupled to conduit 112 and conduit 128 of filter assembly 120, and is positioned intermediate inlet 110 and methane permeable filter 130. Illustratively, second gas permeable filter 202 is positioned in series with methane permeable filter 130.

Second gas permeable filter 202 separates or filters inert gases from the incoming, raw natural gas from gas source 102 before the natural gas flows into methane permeable filter 130. For example, second gas permeable filter 202 may be configured to separate inert gases, such as $O_2$, $N_2$, and $CO_2$, from the incoming natural gas from gas source 102. The inert gases may be exhausted into the atmosphere through conduit 206. The remaining filtered gas is directed into methane permeable filter 130 though conduit 128 to separate methane gas from at least the remaining hydrocarbons. The methane gas flows into engine 150 through conduit 132 and the hydrocarbons flow toward reformer apparatus 180 through conduit 134. Alternatively, the hydrocarbons separated from the methane gas by methane permeable filter 130 may be stored for intermittent injection into engine 150, or may be disposed of and removed from natural gas fueling system 200.

The size of the pores of second gas permeable filter 202 may be different than the size of the pores of methane permeable filter 130 to allowing filtering the inert gases from the methane gas and hydrocarbons. For example, second gas permeable filter 202 may have a critical volume ($V_C$) of approximately 70-90 cm³/mol. Additionally, second gas permeable filter 202 may be comprised of a polymeric material. For example, materials comprised of acetate, polyimide, ether, amide, silicone rubber, and other polymeric materials may be used for second gas permeable filter 202. The properties of second gas permeable filter 202 may be modified to adjust the properties of the inert gases separated from the natural gas. For example, the porosity, critical volume, and/or material of second gas permeable filter 202 may be modified to facilitate the output of methane gas which has a specific and consistent methane number.

Figure 3:
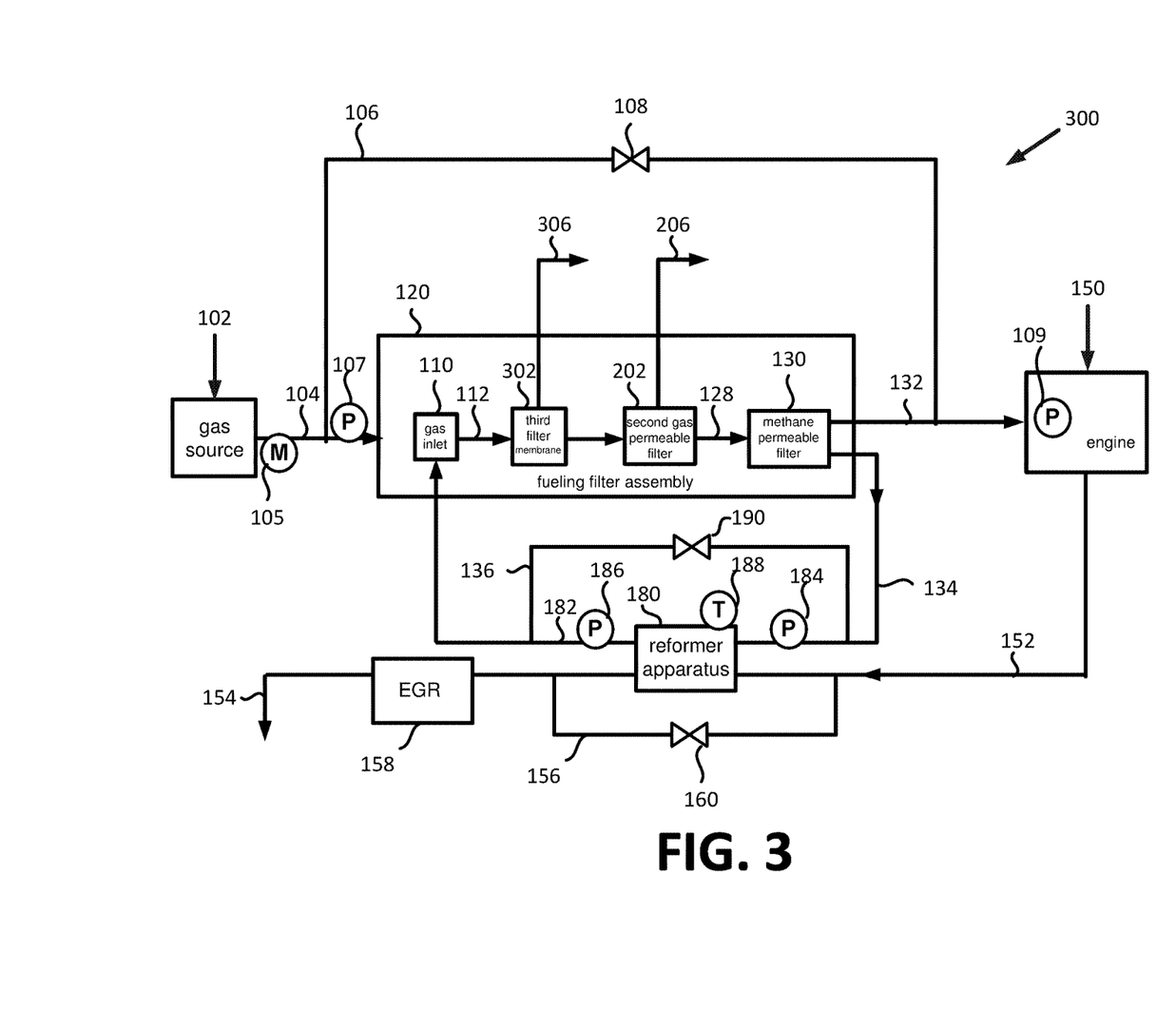
FIG. 3 is a block diagram illustrating a further alternative embodiment natural gas fueling system set forth in the disclosure.

Referring to FIG. 3, an alternative embodiment natural gas fueling system 300 is shown. Natural gas fueling system 300 is similar to natural gas fueling system 200 (FIG. 2) and is operably coupled to engine 150. Similar to natural gas fueling system 200, natural gas fueling system 300 includes gas source 102, inlet 110, filter assembly 120, and reformer apparatus 180, and is configured to separate methane gas from the natural gas stream with methane permeable filter 130 and reform the contaminant gases into methane gas through a catalytic process. Natural gas fueling system 300 further includes a third filter assembly operably coupled to filter assembly 120. The third filter assembly includes a third filter member 302 and a conduit 306. In particular, as shown in FIG. 3, third filter member 302 is operably coupled to conduit 112 and second gas permeable filter 202, and is positioned intermediate inlet 110 and second gas permeable filter 202. Illustratively, third filter member 302 is positioned in series with methane permeable filter 130 and second gas permeable filter 202.

The third filter assembly may be configured as a drying assembly for removing water from natural gas fueling system 300. For example, third filter member 302 may be configured as a condenser for condensing water vapor in the incoming, raw natural gas to liquid water. As such, water vapor is removed from the natural gas before the natural gas flows into second gas permeable filter 202 and methane permeable filter 130. The water from third filter member 302 may be removed from natural gas fueling system 300 through conduit 306. Alternatively, the water from third filter member 302 may remain within natural gas fueling system 300 to cool various components. For example, the water removed from the natural gas by third filter member 302 may be directed to conduit 134 in order to decrease the temperature of the hydrocarbons before entering reformer apparatus 180.

Figure 3A:
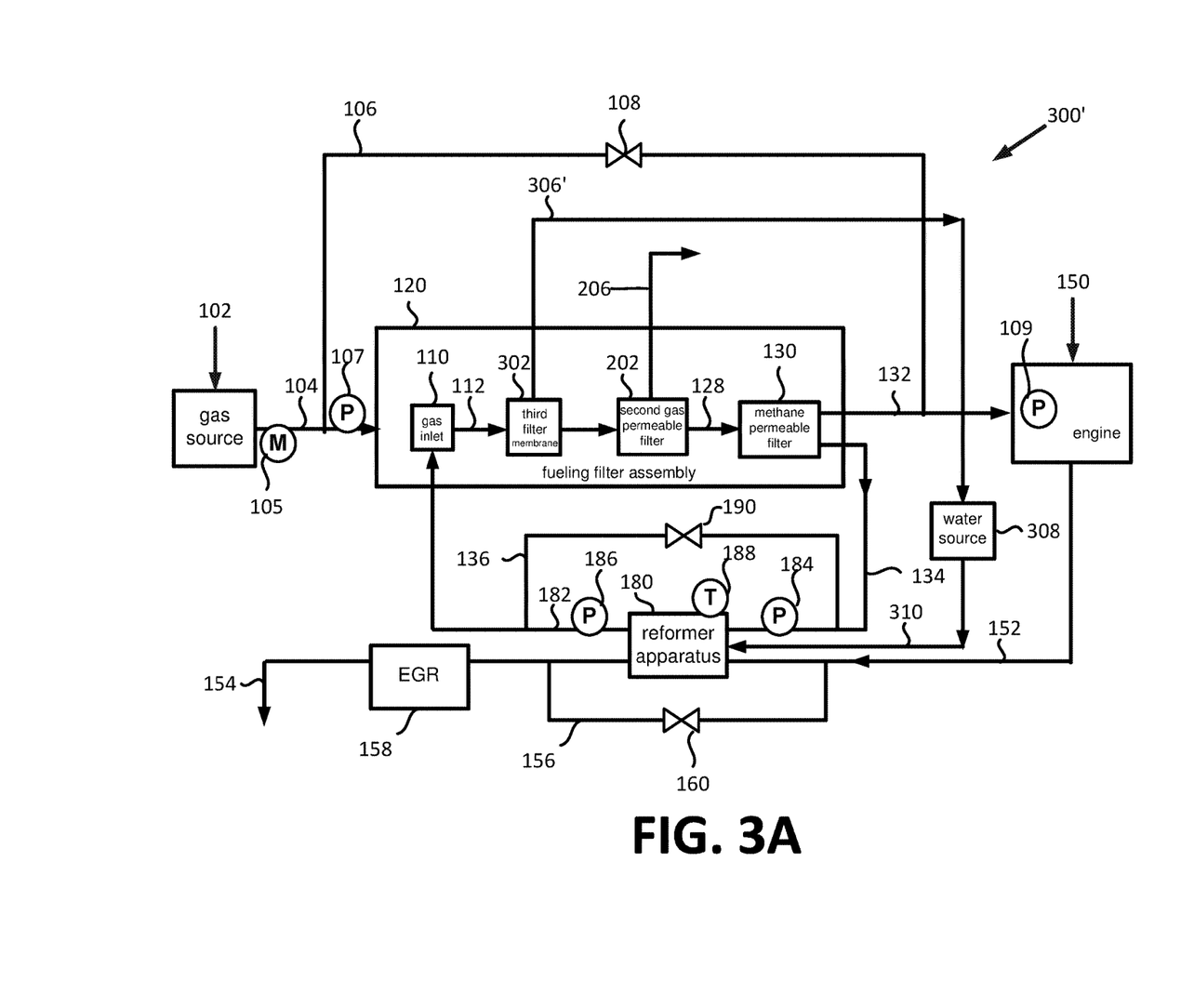
FIG. 3A is an alternative embodiment block diagram illustrating an alternative embodiment of the natural gas fueling system of FIG. 3 and including a water source.

Referring to FIG. 3A, an alternative embodiment of natural gas fueling system 300 of FIG. 3 is shown as natural gas fueling system 300'. Natural gas fueling system 300' is similar to natural gas fueling system 300 (FIG. 3) and is operably coupled to engine 150. Similar to natural gas fueling system 300, natural gas fueling system 300' includes gas source 102, inlet 110, filter assembly 120, and reformer apparatus 180, and is configured to separate methane gas from the natural gas stream with methane permeable filter 130 and reform the contaminant gases into methane gas through a catalytic process. Natural gas fueling system 300' further includes the third filter assembly operably coupled to filter assembly 120. The third filter assembly includes third filter member 302 and a conduit 306'. In particular, as shown in FIG. 3, third filter member 302 is operably coupled to conduit 112 and second gas permeable filter 202, and is positioned intermediate inlet 110 and second gas permeable filter 202. Illustratively, third filter member 302 is positioned in series with methane permeable filter 130 and second gas permeable filter 202.

The third filter assembly of FIG. 3A may be configured as a drying assembly for removing water from natural gas fueling system 300'. For example, third filter member 302 may be configured as a condenser for condensing water vapor in the incoming, raw natural gas to liquid water. As such, water vapor is removed from the natural gas before the natural gas flows into second gas permeable filter 202 and methane permeable filter 130. The water from third filter member 302 may be directed to a water source or storage container 308 through conduit 306'. The water in water source 308 is further directed to reformer apparatus 180 through a conduit 310. In this way, water may be provided to reformer apparatus 180 in either liquid form or vapor form (i.e., steam) to interact with particular catalyst alloy combinations that may be required for specific applications of engine 150. For example, the water from water source 308 may be necessary to activate the catalyst within reformer apparatus 180. Natural gas fueling system 300' may further include valves, seals, and sensors, such as pressure and/or temperature sensors, for water source 308 and conduit 310.

Figure 4:
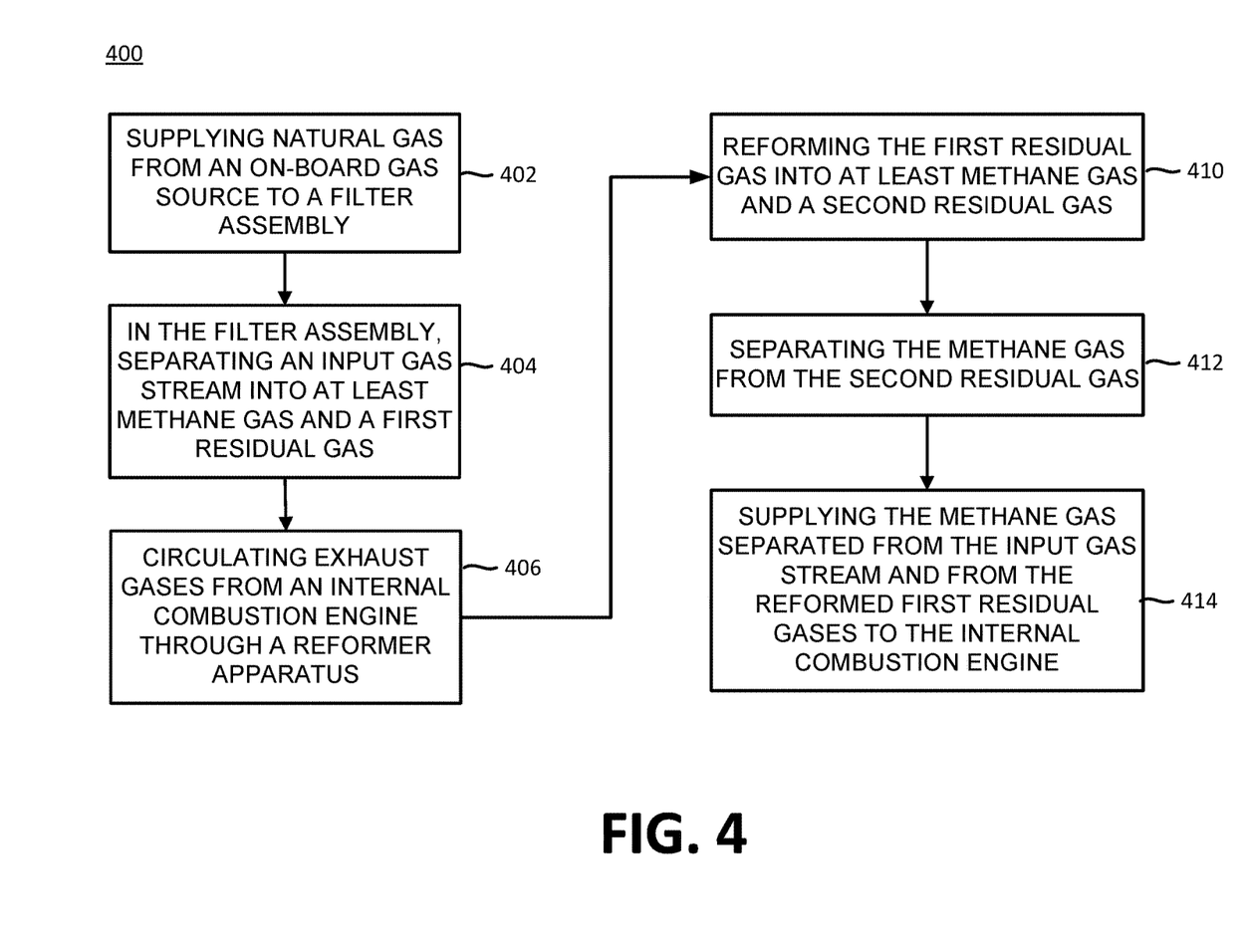
FIG. 4 is a flowchart of the operation of an embodiment of the natural gas fueling method set forth in the disclosure.

As shown in FIG. 4, a method of operating natural gas fueling systems 100, 200, or 300 is shown, and includes steps 402, 404, 406, 410, 412, and 414. When supplying natural gas to engine 150 with natural gas fueling system 100, 200, or 300, natural gas is first supplied from on-board gas source 102 to filter assembly 120, as shown in step 402. As shown in step 404, filter assembly 120 separates the natural gas into methane gas and a first contaminant gas, which includes hydrocarbons. The methane gas is injected into engine 150 for combustion therein and the first contaminant gas flows into reformer apparatus 180. As shown in step 406, exhaust gases from engine 150 are directed to reformer apparatus 180 and heat the catalyst therein in order to reform the first contaminant gas. As shown in step 410, the first contaminant gas is reformed into at least methane gas and a second contaminant gas. In particular, at least the hydrocarbons of the first contaminant gas are cracked and reformed into methane gas such that the first contaminant gas is separated into a methane gas stream and a second contaminant gas stream. As shown in step 412, the methane gas from reformer apparatus 180 is separated from the second contaminant gas when circulated through methane permeable filter 130. Additionally, the continuously incoming stream of raw natural gas is separated into methane gas and contaminant gases. Both the methane gas from reformer apparatus 180 and the methane gas from the raw natural gas are supplied to engine 150 for combustion, as shown in step 414. This filtering and reforming process continues during operation of natural gas fueling systems 100, 200, and 300 to increase the quantity of methane available for use from the natural gas and to provide methane gas to engine 150 that has a consistent methane number required for specific engine operation, regardless of the quality and/or methane number of the raw natural gas. For example, the methane gas supplied to engine 150 in step 414 may have a methane number of approximately 50-100 and, more particularly, a methane number of approximately 70.

As disclosed herein, the methane number of the fuel supplied to engine 150 may be maintained at a generally constant index value (e.g., 70 MN). By adjusting the properties of filter assembly 120, and in particular, methane permeable filter 130, the combustion characteristics of the methane supplied to engine 150 may be tuned or adjusted to the specific applications and power outputs required for engine 150. For example, if the critical volume, porosity, pore size, material, or other parameters of methane permeable filter 130 are adjusted, the methane number of the fuel supplied to engine 150 is adjusted. As such, natural gas fueling systems 100, 200, and 300 are configured to tune the fuel provided to engine 150 to the specific requirements of engine 150.

Figure 5:
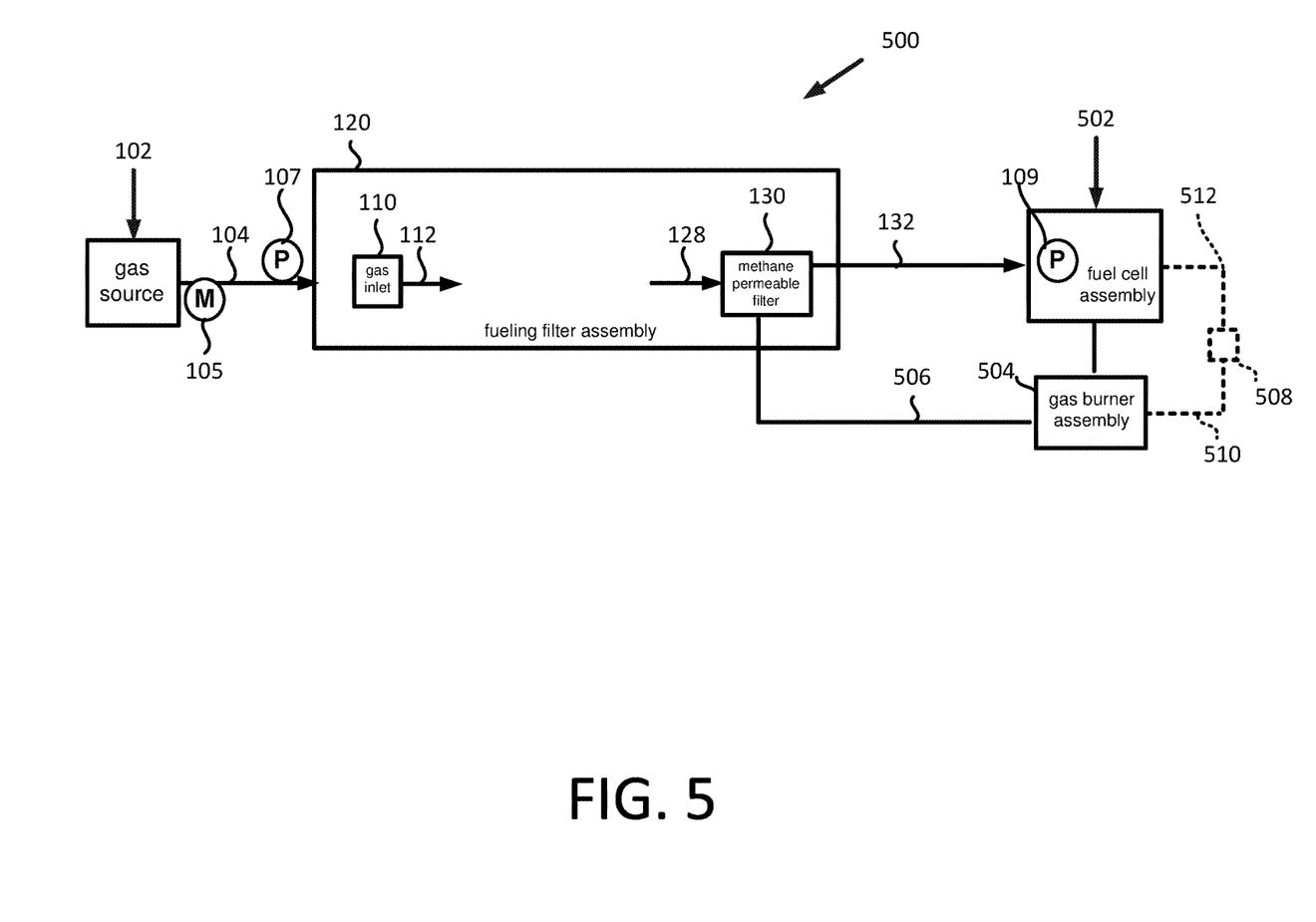
FIG. 5 is a block diagram illustrating another alternative embodiment natural gas fueling system set forth in the disclosure.

Referring to FIG. 5, an alternative embodiment natural gas fueling system 500 is shown. Natural gas fueling system 500 is similar to natural gas fueling system 100 (FIG. 1) and is operably coupled to engine 150 and/or any other energy source (e.g., a fuel cell). Illustratively, natural gas fueling system 500 is operably coupled to a fuel cell assembly 502, which, in one embodiment, is a solid-oxide fuel cell assembly. Similar to natural gas fueling system 100, natural gas fueling system 500 includes gas source 102, inlet 110, and filter assembly 120, and is configured to separate methane gas from the natural gas stream with methane permeable filter 130. In one embodiment, filter assembly 120 includes methane permeable filter 130 which may have a cylindrical or canister-type configuration and can be directly coupled to engine 150, an engine skid for engine 150, and/or is otherwise operably coupled to fuel cell assembly 502. Natural gas fueling system 500 further includes a supplemental fluid assembly, illustratively a gas burner assembly 504, operably coupled to filter assembly 120 and fuel cell assembly 502. In one embodiment, gas burner assembly 504 includes catalytic burner elements (not shown) to improve the quality of any exhaust emissions therefrom.

The natural gas flows from gas source 102 into methane permeable filter 130 though conduit 128 to separate methane gas from at least the remaining hydrocarbons. The methane gas flows into engine fuel cell assembly 502 through conduit 132 to provide fuel to fuel cell assembly 502 while the hydrocarbons which are too large to flow through methane permeable filter 130 flow toward gas burner assembly 504 through a conduit 506. The larger or unsaturated hydrocarbons feed gas burner assembly 504 so that gas burner assembly 504 may heat fuel cell assembly 502. Because natural gas fueling system 500 of FIG. 5 does not include reformer apparatus 180 (FIG. 1), the larger hydrocarbons and/or other gases are filtered by methane permeable filter 130 but are not reformed before being supplied to gas burner assembly 504. Similarly, the methane supplied to fuel cell assembly 502 from methane permeable filter 130 also is not reformed.

The size of the pores of methane permeable filter 130 is configured to allow methane gas to pass through and flow to fuel cell assembly 502 but is not configured to allow larger hydrocarbons or other gases (e.g., gas molecules larger than ethane) to flow toward fuel cell assembly 502. Instead, larger hydrocarbons and/or other gases are directed from methane permeable filter 130 to gas burner assembly 504 where the larger hydrocarbons and/or other gases may be burned to supply heat to fuel cell assembly 504.

In one embodiment of natural gas fueling system 500, a charging member 508 may be operably coupled to gas burner assembly 504 and fuel cell assembly 502, as shown in FIG. 5. More particularly, charging member 508 is fluidly coupled to gas burner assembly 504 through an exhaust conduit 510 and is fluidly coupled to fuel cell assembly 502 through a blower conduit 512. In this way, exhaust gases from gas burner assembly 504 may drive a turbine portion of charging member 508 which operates a blower or compressor portion of charging member 508 and/or a front-end blower (not shown) for fuel cell assembly 502. As such, air/reformate flow into the fuel cells of fuel cell assembly 502 may be maintained by charging member 508 through the exhaust from gas burner assembly 504.

Figure 6:
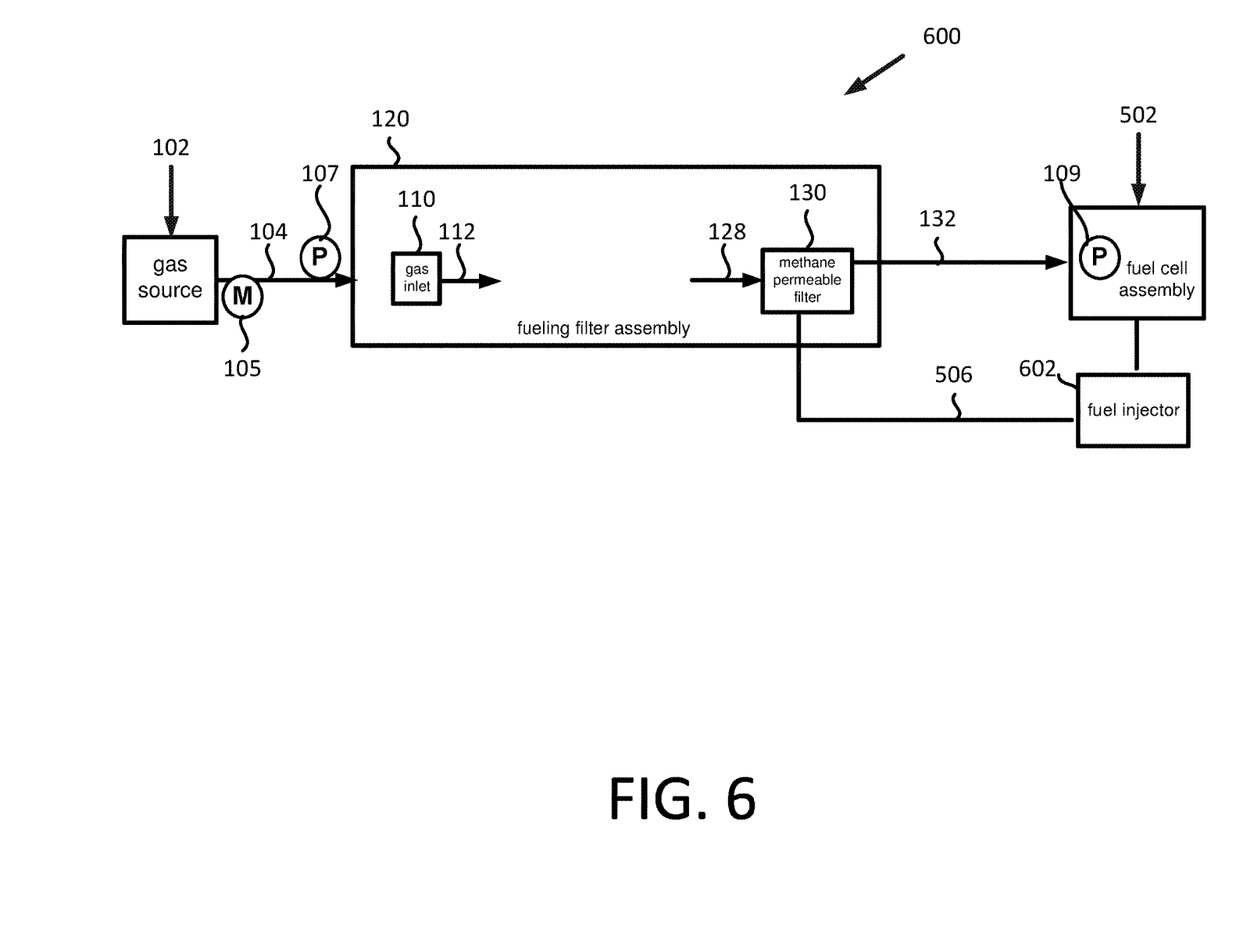
FIG. 6 is a block diagram illustrating a further alternative embodiment natural gas fueling system set forth in the disclosure.

Referring to FIG. 6, an alternative embodiment natural gas fueling system 600 is shown. Natural gas fueling system 600 is similar to natural gas fueling system 500 (FIG. 5) but gas burner assembly 504 of FIG. 5 may be replaced with at least one fuel injector 602. Fuel injector 602 is fluidly coupled to fuel cell assembly 502. More particularly, fuel cell assembly 502 may include a plurality of fuel cell stacks (not shown) and at least one fuel injector 602 is fluidly coupled to each of the fuel cell stacks.

Natural gas fueling system 600 operates by flowing natural gas from gas source 102 and into methane permeable filter 130 though conduit 128 to separate methane gas from at least the remaining hydrocarbons. The methane gas flows into fuel cell assembly 502 through conduit 132 to provide fuel to fuel cell assembly 502. The hydrocarbons which are too large to flow through methane permeable filter 130 flow toward fuel injector 602 through a conduit 506. The larger or unsaturated hydrocarbons are provided as "trim" fuel for fuel cell assembly 502. More particularly, the filtered methane gas provided to fuel cell assembly 502 through line 132 defines the base fueling rate while the unfiltered, larger hydrocarbon fuel (i.e., the trim fuel) defines an additional or supplemental fueling rate. Collectively, the base fueling rate from the filtered methane gas and the additional fueling rate from the trim fuel define the final fueling level or rate for each fuel cell within fuel cell assembly 502.

By combining the filtered methane gas provided directly to fuel cell assembly 502 and the trim fuel provided to fuel cell assembly through fuel injector 602, the array of fuel cells within fuel cell assembly 502 may be balanced and operation of the fuel cells is tailored to specific conditions to optimize operation of fuel cell assembly 502. Additionally, this balanced fueling provided by the filtered methane gas and the trim fuel may allow for simpler and/or less expensive valve mechanisms to be used for fuel cell assembly 502. For example, a single hot or cold metered delivery valve may be provided on line 132 to deliver the filtered methane gas to fuel cell assembly 502 but a single cold delivery valve may be fluidly coupled to fuel injector 602 and/or fuel cell assembly 502 to provide the trim fuel to fuel cell assembly 502. The cold delivery valve is less expensive than the hot or cold metered delivery valve and, therefore, the cost of natural gas fueling system 600 may decrease.

In one embodiment, water may be added to natural gas fuel system 600 to allow the fuel within fuel cell assembly 502 to reform therein or self-reform. In one embodiment, water may be provided to natural gas fuel system 600 in a single feed or a plurality of individual feeds.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A natural gas fueling system for an energy source, comprising:
   a filter assembly including a gas inlet configured to receive inlet gas and a methane permeable filter configured to separate methane gas and first contaminant gases from the inlet gas; and
   a conduit fluidly coupled to the filter assembly and the energy source to deliver the methane gas to the energy source; and
   a supplemental fluid assembly fluidly coupled to the filter assembly and the energy source, the energy source being configured to receive the first contaminant gases from the supplemental fluid assembly.

2. The natural gas fueling system of claim 1, wherein the energy source is a fuel cell assembly.

3. The natural gas fueling system of claim 2, further comprising a charging member fluidly coupled to the supplemental fluid assembly and the energy source.

4. The natural gas fueling system of claim 3, wherein the charging member includes a turbine portion and a blower portion.

5. The natural gas fueling system of claim 1, wherein the supplemental fluid assembly defines a gas burner assembly configured to receive the first contaminant gases and provide heat to the energy source.

6. The natural gas fueling system of claim 1, wherein the supplemental fluid assembly defines at least one fuel injector configured to receive the first contaminant gases and provide supplemental fuel to the energy source.

7. A method of fueling an energy source, the method comprising:
   supplying natural gas to a filter assembly;
   separating the natural gas into at least methane gas and a first contaminant gas in the filter assembly;
   delivering the methane gas to the energy source; and
   providing the first contaminant gas to the energy source.

8. The method of claim 7, further comprising delivering the first contaminant gas to a supplemental fluid assembly fluidly coupled to the energy source and the filter assembly.

9. The method of claim 8, further comprising providing a gas burner assembly configured to receive the first contaminant gases and provide heat to the energy source as the supplemental fluid assembly.

10. The method of claim 8, further comprising providing at least one fuel injector configured to receive the first contaminant gases and provide supplemental fuel to the energy source as the supplemental fluid assembly.

11. The method of claim 7, further comprising providing a fuel cell assembly as the energy source.

12. The method of claim 7, further comprising fluidly coupling a charging member to the supplemental fluid assembly and the energy source.

* * * * *